United States Patent [19]

Mark et al.

[11] Patent Number: 5,208,653
[45] Date of Patent: * May 4, 1993

[54] MULTIOSCILLATOR RING LASER GYROSCOPE ADAPTIVE DIGITALLY CONTROLLED CAVITY LENGTH CONTROL SYSTEM

[75] Inventors: John G. Mark, Pasadena; Daniel A. Tazartes, West Hills; Tae W. Hahn, Chatsworth, all of Calif.

[73] Assignee: Litton Systems, Inc., Beverly Hills, Calif.

[*] Notice: The portion of the term of this patent subsequent to Dec. 24, 2008 has been disclaimed.

[21] Appl. No.: 741,291

[22] Filed: Aug. 6, 1991

Related U.S. Application Data

[63] Continuation-in-part of Ser. No. 640,179, Nov. 1, 1991, Pat. No. 5,074,664.

[51] Int. Cl.$^5$ .............................................. G01B 9/02
[52] U.S. Cl. ................................................... 356/350
[58] Field of Search ............................ 356/350; 372/94

[56] References Cited

U.S. PATENT DOCUMENTS 4,963,026 10/1990 Hahn ................................ 356/350
5,074,664 12/1991 Mark et al. ....................... 356/350

Primary Examiner—Samuel A. Turner
Attorney, Agent, or Firm—L. David Rish; M. Michael Carpenter

[57] ABSTRACT

Disclosed herein is a Digitally Controlled Cavity Length Control System comprising, in a preferred embodiment, an adaptive servo-loop for cavity length, modulation depth and amplitude control, and of the multioscillator ring laser gyroscope; thereby, permitting the simultaneous control of these elements. The cavity length control of the multioscillator, by including a variable RF detector gain, allows the operation of the gyroscope in a slightly detuned fashion to minimize magnetic sensitivity. In this manner, the multioscillator gyroscope may be maintained at a stable operating point suitable for modeling.

9 Claims, 4 Drawing Sheets

MULTIOSCILLATOR RING LASER GYROSCOPE ADAPTIVE DIGITALLY CONTROLLED CAVITY LENGTH CONTROL SYSTEM

CROSS-REFERENCE TO RELATED APPLICATIONS

This is a continuation-in-part (CIP) of copending application Ser. No. 07/640,179 filed Nov. 1, 1991 (now U.S. Pat. No. 5,074,664, granted). The disclosure contained in U.S. Pat. application Ser. No. 07/640,179 is hereby incorporated by reference.

BACKGROUND OF THE INVENTION

1. Field of the Invention

This invention relates to cavity length control systems for ring laser gyroscopes, and more particularly, to a cavity or pathlength control which digitally provides adaptive control of the ring laser gyroscope cavity length.

2. Description of Related Art

The planar ring laser gyroscope was a first attempt at a non-mechanical truly strap-down inertial navigation sensor. At low rotation rates, the retroscatter from the mirrors couples energy from one of the oscillating beams into the oppositely propagating beam which locks the oscillating frequencies together yielding zero rotation information at low rotation rates. Current operational ring laser gyroscopes having a planar configuration use mechanical dithering schemes to bias the rate sensor to avoid this well known lock-in phenomenon. Mechanical dither is very effective in reducing the effects of lock-in and makes the ring laser gyroscope a viable navigational gyroscope. However, an effective mechanically dithered ring laser gyroscope adds a noise component to the output of the ring laser which in turn reduces its ultimate accuracy. Also, the presence of mechanical dither, either in the mirrors or full body dither, detracts from the desired goal of a fully strapped down inertial navigational unit.

With these problems in mind, alternative biasing techniques have been developed using the nonreciprocal Faraday effect by either applying a magnetic field to a magnetic mirror (using the Kerr effect) or directly to the gain medium (using the Zeeman effect), or to a solid glass element known as a Faraday rotator, which when used in combination with the magnetic field, provides a Faraday effect phase shift for one beam that is opposite the phase shift of the oppositely directed beam whereby two counter rotating beams are split in frequency. To achieve actual phase shifts instead of simple polarization rotation, two pairs of oppositely directed circularly polarized beams are optimally present within a single optical path to achieve a desired result. An example of this theory of multioscillator ring laser gyroscope may be found in U.S. Pat. No. 4,818,087 entitled "ORTHOHEDRAL RING LASER GYRO" issued Apr. 4, 1989 to Raytheon Corporation (Terry A. Dorschner, inventor). The nonplanar ray path produced in a multioscillator ring laser gyroscope ensures circular polarized reciprocally split light. The nonplanar ray path reciprocally rotates the polarizations by many degrees yielding the necessary circular polarization. The nonplanar reciprocal phase shift also achieves two Faraday bias gyroscopes, the gain curve 10 of which is illustrated in FIGS. 1A through 1C. FIGS. 1A through 1C show graphical representations of the power gain curve 10 of a multioscillator ring laser gyroscope (and any variations of these gain curves are shown at 10'). The nonplanar ray path splits the light through its geometry into two separate gyroscopes, one being left circularly polarized (LCP) and the other right circularly polarized (RCP). This splitting is known as reciprocal splitting and typically is in the range of 100's of MHz. By placing a Faraday element in the beam path of a nonplanar ring laser gyroscope, when the proper magnetic field is applied to the Faraday element, nonreciprocal splitting of each gyroscope is achieved.

An integral number of wavelengths around the light beam cavity path of the gyroscope is required to support resonant operation. As shown in FIG. 1A, at least four modes are produced: a left circularly polarized anti-clockwise beam ($W_{LA}$), having an amplitude ($A_{LA}$), a left circularly polarized clockwise beam ($W_{LC}$), having an amplitude ($A_{LC}$), a right circularly polarized clockwise beam ($W_{RC}$), having an amplitude ($A_{RC}$), and a right circularly polarized anti-clockwise beam ($W_{RA}$), having an amplitude ($A_{RA}$). FIG. 1A is a graphical representation of the power gain curve 10 of a multioscillator ring laser gyroscope. An integral number of wavelengths around the light beam cavity path of the inertial system is required to produce oscillation $W_{LA}$, $W_{LC}$, $W_{RA}$, and $W_{RC}$. The Faraday (nonreciprocal) splitting between clockwise and anti-clockwise modes is about 1 MHz. At least four mirrors form the ring resonator path, which contains the two gyroscopes, left and right circularly polarized. One of the mirrors is slightly transmissive to allow light to leave the resonator and impinge upon a photo detector for signal processing. When the signals are processed electronically to remove the Faraday bias, the scale factor of the gyroscope is doubled over the conventional ring laser gyroscope. The nonplanar geometry multioscillator ring laser gyroscope using a Faraday element is currently manufactured using a gas discharge pump to provide the active medium, which occupies a portion of the light beam path. The multioscillator ring laser gyroscope produces two signals which are optically biased (due to the Faraday cell). One signal frequency is the Faraday frequency plus one half the rate frequency; the other is the Faraday frequency minus one half the rate frequency. The gyroscope outputs the phase (integrated frequency) of these two signals. Their difference represents a rotation angle increment. However, the output signals are quantized at discrete levels separated by $2\pi$ of the gyroscope phase (i.e., an interference fringe).

The two output signals from the multioscillator are produced by heterodyning the like-polarized counter-propagating optical signal beams. Such signals are called heterodyne signals. One or more heterodyne signal is created for the left hand circularly polarized gyroscope and one or more is created for the right hand circularly polarized gyroscope. This can be accomplished either with an optical polarizer or other signal processing scheme. The heterodyne signals represent intensity fringes.

Optical signal fringes are produced by the heterodyne signals and detected by a pair of photo sensors. The curve 10 of FIG. 1A will hereinafter be assumed to be symmetrical about a central axis frequency ($W_C$), $W_C$ located at the center of maximum gain. Thus, the power amplitudes $A_{LA}$ and $A_{LC}$ corresponding to the frequencies $W_{LA}$ and $W_{LC}$ are respectively symmetrical to the power amplitudes $A_{RA}$ and $A_{RC}$ with respect to the central axis. As will be described later in greater detail, the cavity length control apparatus of the present invention causes the inertial sensor to operate at a substantially maximum power gain, and maintains this maximum gain condition. In this regard, and for the purpose of retaining a maximum overall output power gain for the inertial sensor, the clockwise propagating beams corresponding to the frequencies $W_{LC}$ and $W_{RC}$ are mixed and processed. It should be understood, however, that the counter-clockwise propagating beams corresponding to the frequency $W_{LA}$ and $W_{RA}$ can be alternatively mixed and processed. However, it has heretofore been known that only two modes are needed to accurately control the cavity length of the inertial sensor.

Heretofore, in a two mode ring laser gyroscope, portions of the counterpropagating beams are superimposed against each other to produce interference fringes which are counted as measures of angular displacement and velocity of the ring laser about a sensing axis. In such gyroscopes, to achieve a consistent calibration of the gyroscope, it is essential that the physical lengths of the paths be maintained. This is also true for multioscilators. To maintain the physical lengths, the ring laser cavity is preferably imbedded in a dimensionally stable laser block. A set of mirrors, (numbering four or more in non-planar multioscillators) are positioned at the intersection of the bores or cavities defining the optical path and such mirrors may be called, "corner mirrors." For convenience of explanation, the ring laser is described with four mirrors and four bores, cavities, or legs.

A ring laser gyroscope is here described with a ring laser having at least two sets of counterpropagating beams (forming at least two independent gyroscopes) traveling around the laser path in the same physical bore space. At least one of the corner mirrors transmits a very small amount of the counterpropagating laser beams to an optical system which usually uses prisms to collect and superimpose them. A sensor senses the interference fringes produced by the superimposed beams, and electronics apparatus responsive to the detected signals counts the fringes and computes the fringe rate, angular displacement, and angular velocity of the laser about a predetermined axis.

One significant problem in any ring laser gyroscope arises in tuning the ring laser cavity to the correct length to support the resonant modes of the counterpropagating beams. The inward-outward position of at least one of the corner mirrors is adjustable to control the cavity length of the ring laser. Although only one adjustable mirror is needed, the apparatus for controlling cavity length described herein may use two adjustable mirrors which increases the range of adjustment of the cavity length.

The partially transparent corner mirror may be any mirror, but it is preferably not one of the movable mirrors. The beams extracted through the partially transparent mirror produce an optical output signal whose count is a measure of the angular displacement sensed by the instrument and whose amplitude is a measure of laser intensity. If desired, intensity and angular information can both be derived from the signal through a single partially transmissive mirror. Alternatively, two different partially transparent mirrors may be used.

A transducer, preferably a piezoelectric transducer having driving electrodes, forces the movable mirror or mirrors inwardly or outwardly, and the amount of inward or outward motion depends upon the voltage delivered to the electrodes.

The scale factor between the amount of voltage applied to the transducer electrodes and the excursion of travel of the mirror attached to the transducer, varies with many factors including but not limited to temperature of the mirror and the transducer, the compliance of the flexure springs supporting the transducer, and the bonding of those flexures. As the transducer scale factor varies, the ratio of its applied control voltage to the corresponding excursion of its attached movable mirror varies, and the amount of voltage change to move the movable mirror inwardly and outwardly to change the cavity length by one laser beam wavelength also varies.

Heretofore, a computer, usually the system computer used for the ring laser, generates digital words or bytes, converts them into an analog signal, and delivers them to control the inward and outward position of the piezoelectric transducer and its attached movable corner mirror. The lasing intensity peaks at inward-outward positions of the movable corner mirror corresponding to cavity lengths that are separated by a distance of one wavelength of the laser beam.

Cavity length control (in a two mode gyroscope) historically was achieved using a "hill climbing" servo which employed analog modulation of the mirror transducer drive voltage followed by analog demodulation of the intensity signal. The modulation/demodulation took place at a fairly high frequency (e.g. six kilohertz). The servo could then be closed via an analog loop which fed back a control voltage which was dependent on the output of the demodulator. A stable operating condition was achieved when the demodulator output was zero on average.

Later, the servo operations were performed by the system computer. An analog-to-digital converter was used to allow the computer to command the control voltage. The apparatus still relied upon the basic six kilohertz (or equivalent) analog modulation and demodulation to produce an error signal for operation of the control loop.

A study revealed that, because of variations in the sensitivity of piezoelectric transducers and of other mirror and gyroscope parameters, such servo loops exhibited very large loop gain variations, thereby leading to inconsistent controller performance and often long convergence times. To solve this problem, two of the applicants hereto, have filed a co-pending patent application, (assigned to the common assignee of this application) entitled "COMPUTER GENERATED CAVITY LENGTH CONTROL WITH AUTOMATIC GAIN CONTROL FOR RING LASER GYROS" on Nov. 1, 1991, Ser. No. 07/640,179. In this co-pending application a primary ("hill-climbing" servo-loop) and secondary (modulation control) servo-loop provide fine tuned control of the cavity length for a two mode ring laser gyroscope. In particular, with reference to FIG. 1B, the 07/640,179 case taught the need to adjust modulation control over a widely varying temperature range, thereby controlling the temperature sensitivity of the cavity length of the ring laser gyroscope. This second harmonic demodulation allowed the cavity length control system to accommodate gain curves like 10' (FIG. 1B) which are characterized by PZT (piezo-transducer) gain changes. By controlling modulation gain and depth, one can accommodate the changing curvature of the intensity gain curve 10' of FIG. 1B over a widely varying temperature range.

Heretofore, the applicant's assignee is also owner of an issued U.S. Pat. No. 4,963,026 (granted Oct. 16, 1990) entitled "CAVITY LENGTH CONTROL APPARATUS FOR A MULTIOSCILLATOR" which teaches an analog primary "hill-climbing" servo-loop subjected to an RF amplitude modulated signal in the range of 1-10 KHz. It is the applicant's desire to take the teaching from the co-pending 07/640,179 case and apply it to the multioscillator situation contemplated in the 4,963,026 patent and improve upon it.

SUMMARY OF THE INVENTION

This invention is directed to a ring laser gyroscope cavity length control system which includes, a monolithic ring laser gyroscope defining an optical pathway having electromagnetic propagating waves circulating among at least three corner mirrors comprising the optical pathway, at least one of which is partially transmissive, and at least one of which is movable inwardly and outwardly. A mirror driver is included for moving the corner mirror inwardly and outwardly for purposes of cavity length control. The cavity length control system includes a system for providing a controlled activation of the mirror driver. This system includes a transducer for measuring the intensity of electromagnetic propagating waves circulating within the gyroscope; a servo-loop control for controlling the movement of the corner mirror, producing a servo-loop control signal that is a function of mirror driver voltage and the change in the electromagnetic propagating wave intensity as such intensity relates to the driver voltage; a modulation control for controlling the amplitude of the modulation of the servo-loop control signal of the servo-loop control, this modulation control additionally producing a gain control signal that is a function of the mirror driver voltage and a sensitivity to the change in the wave intensity as such intensity relates to the driver voltage; and, a radio-frequency (RF) gain control for adjusting the amplitude of a detected signal representing gyroscope intensity. In this manner, a stable servo-loop gain is achieved for controlling the multioscillator gyroscope corner mirror.

Figure 3:
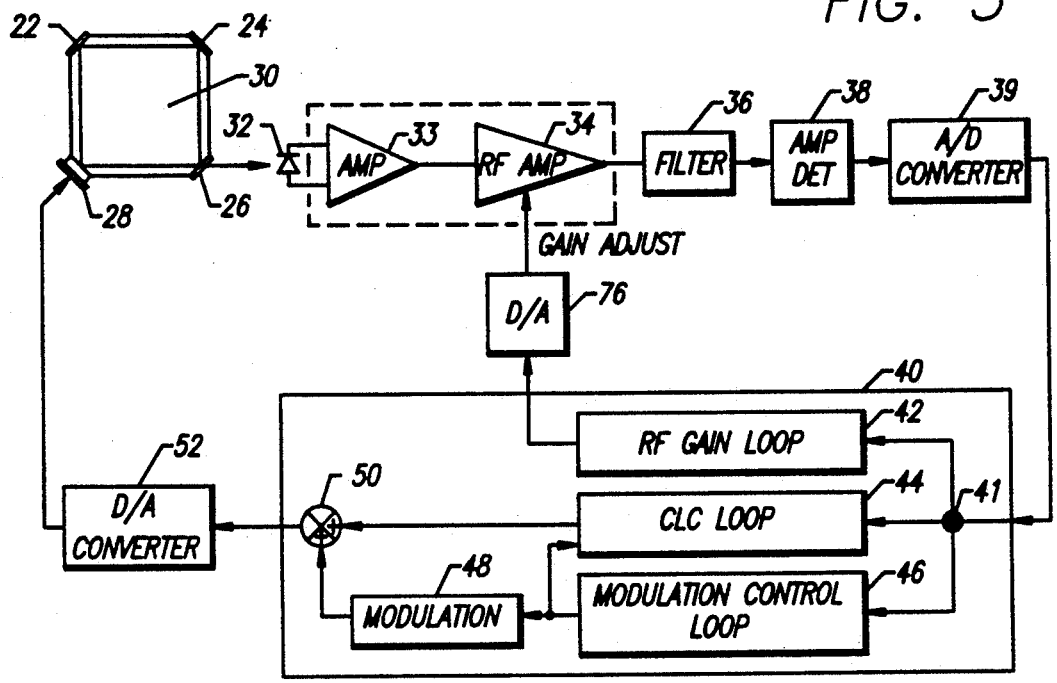
FIG. 3 is a schematic diagram showing the hardware configuration of the multioscillator ring laser gyroscope digitally controlled cavity length control system of this invention.
Figure 4:
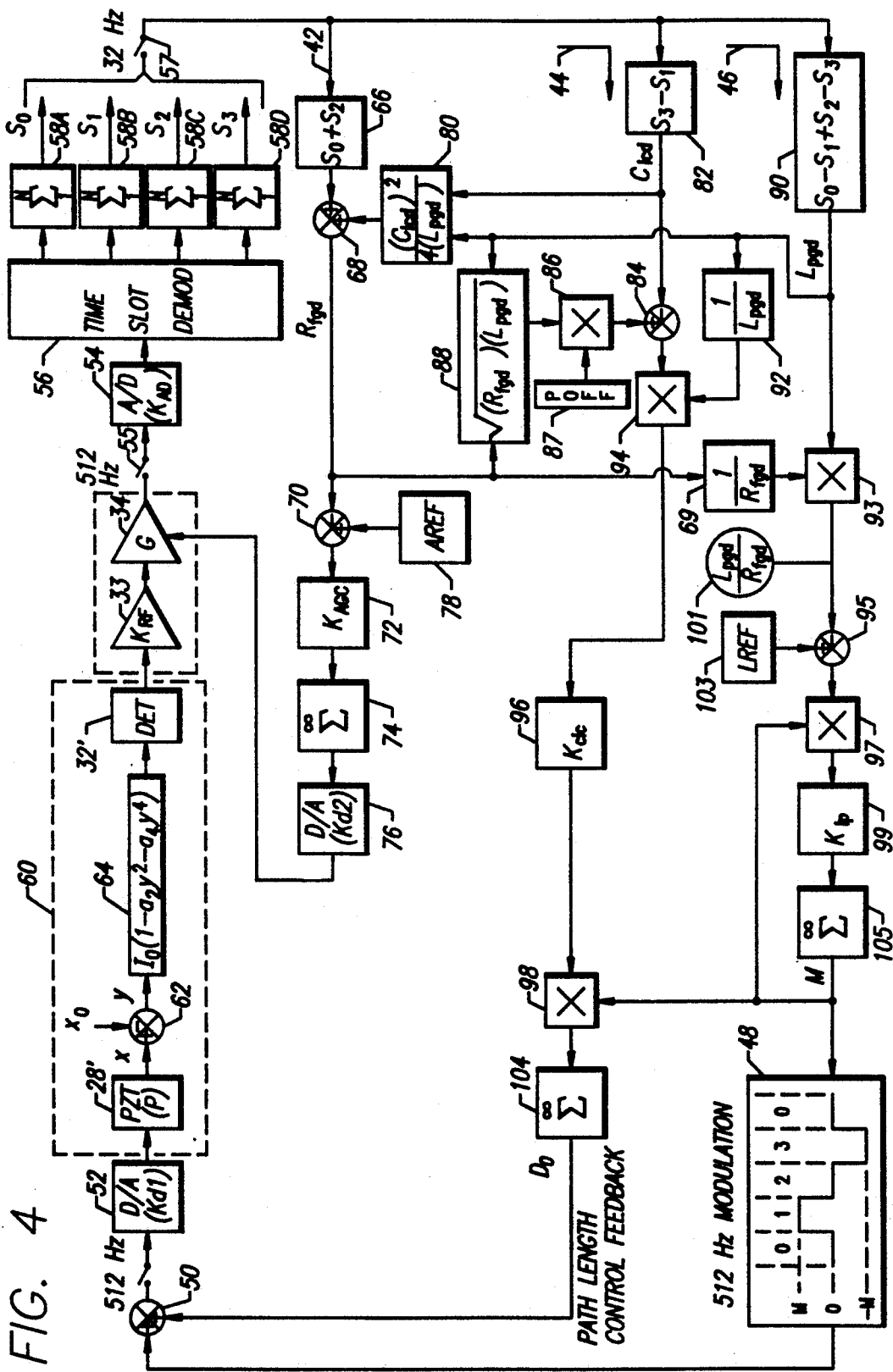
FIG. 4 is a schematic diagram showing a hybrid digital hardware and software configuration of the multioscillator ring laser gyroscope cavity length control system of this invention detailing the flow of signal information.

FIG. is a detailed timing diagram showing the operations of the signal modulation source block 48 of FIGS. 3 and 4 of this invention.

DETAILED DESCRIPTION OF THE PREFERRED EMBODIMENT

This invention is directed to a microprocessor based system which makes use of software generated mirror modulation and CLC output demodulation for use in a multioscillator ring laser gyroscope. Although the control is entirely microprocessor based, pathlength control with stable loop gain may also be achieved with an analog systems approach, along the lines shown and described herein with reference to FIGS. 3 and 4. However, the microprocessor based system provides resolution and control that is hard for such an analog system to match. The applicants' invention is directed to modulation amplitude control of the CLC signal modulation in "the mode spacing" domain. In order to accommodate the special needs of the multioscillator to be able to operate offset from the maximum intensity of the gyroscope gain curve, an RF gain control system is provided, which in the preferred embodiment may be a Software AGC (automatic gain control) loop. Also, the RF gain control system acts to adjust the gain of the RF amplifier 34 (FIG. 3) so that the gyroscope signal intensity, either too low or too high, may be compensated for. This invention allows the cavity length control system to continue to function when the cavity length control point of the multioscillator is offset (in order to allow equalization of the gain dispersion of the gyroscope cavity), by providing a mechanism which allows the modulation control and the RF gain control system to adjust the primary CLC servo-loop with reference to a predetermined offset value. The cavity length control system described herein decouples interaction between the modulation and loops. As these loops are converged, the interaction of the secondary loops with each other is not significant. Loop interactions have been resolved analytically and removed, except where deliberate and beneficial to the system's performance. In transient conditions (i.e. turn-on), loop interaction can cause cross-perturbations which delay convergence (steady state) temporarily.

To accomplish the goal of flexible and adaptive cavity length control, three loops are implemented, as shown in FIG. 3. The fundamental loop is the CLC control loop 44 which maintains the cavity length at a predetermined value (specified by the path length offset 87). The modulation control loop 46 adjusts the mirror modulation amplitude and the CLC loop gain to provide a well controlled, stable primary loop and to ensure that the gyroscope is modulated a relatively constant percentage of a mode spacing. The RF gain control loop 42 adjust the gain of the RF signal gain so as to provide a predetermined signal level output. The RF gain is adjusted based on the projected mode peak amplitude rather than the operating point amplitude (which is a function of the path length offset). While substantial interaction may normally be present between the three loops, analytic expressions have been derived to calculate and correct for interaction and hence reduce or eliminate it.

Figure 5:
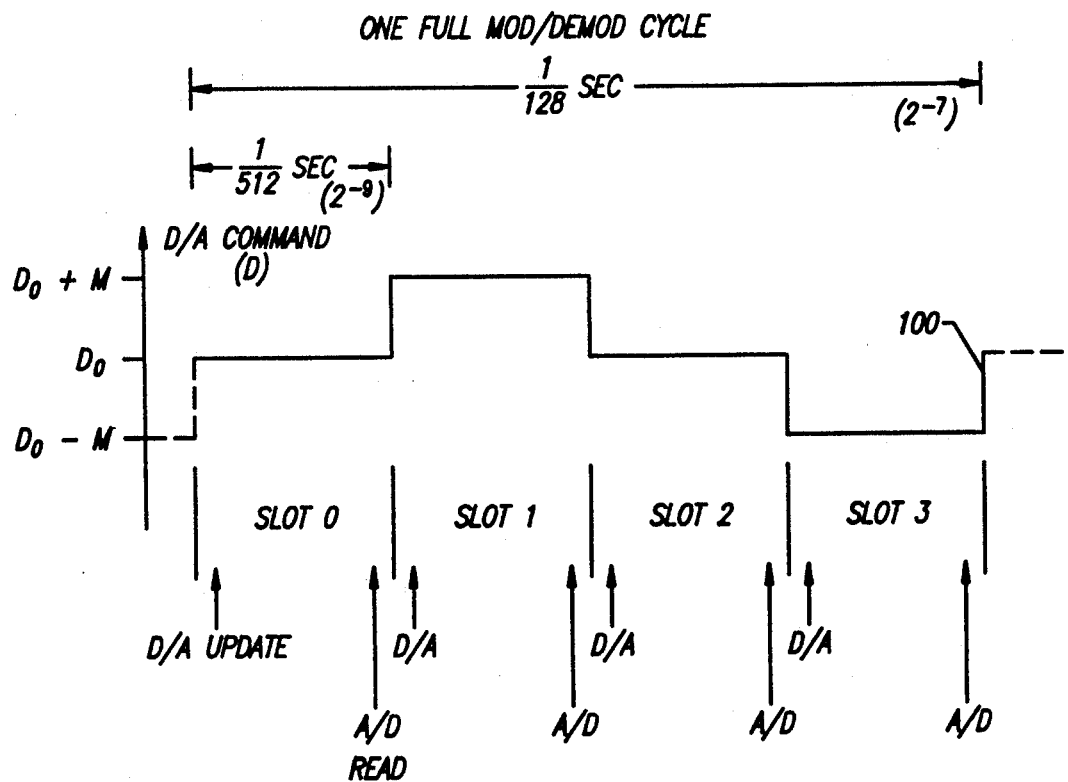

With reference to FIG. 3, a ring laser multioscillator gyroscope 30 may be configured using a set of four corner mirrors 22, 24, 26, and 28 (configured slightly out-of-plane, this non-planar arrangement of mirrors not shown in FIG. 3, but known in the art). One of the corner mirrors, such as mirror 26, may be partially transmissive so that the two anticlockwise (or alternately the two clockwise) beams pass from the gyroscope to the photodiode 32. The mixing of the two beams creates a signal whose frequency is the difference between the two beam frequencies. This frequency difference resulting from reciprocal splitting is typically in the 100's of MHz. The mixed signal at the output of the photodiode 32 is passed through a high frequency transimpedance amplifier 33 and an RF amplifier 34, before being transmitted to a band pass filter 36. (Amplifiers 33 and 34 may be the model IN A-03170, low noise, cascadable silicon bipolar MMIC amplifier manufactured by Avantek, Inc. of Santa Clara, CA.) The signal amplitude sensed is by the amplitude detector 38, which detector 38 is connected to the input of an A/D converter 39, which converts the analog detected signal into a digitized signal, which digitized signal is provided at the output of the A/D converter 39. The digitized signal at the output of the A/D converter 39 is fed into a branching junction 41, and then distributed through the branching junction 41 to different branches of the CLC control circuitry 40. These branches comprise the RF gain loop 42, the CLC loop 44, and the modulation control loop 46. The output of the modulation control loop 46 is processed back into the CLC loop 44, and on to the computer generated signal modulation source block 48 (Which produces a signal 100 as shown in FIG. 5). The output of the CLC loop 44 and the signal modulation source block 48 are summed at summing junction 50. The resulting output signal from the summing junction 50 is then processed and converted to an analog voltage by the D/A converter 52. The converted signal is fed into a piezo-electric transducer affixed to the mirror 28, which causes the mirror 28, to be maintained at an average position corresponding to the desired operating point, and to be modulated at the modulation frequency (e.g. 128 Hz) supplied via block 48 by the D/A converter 52, derived from a digitized signal.

Figure 1A:
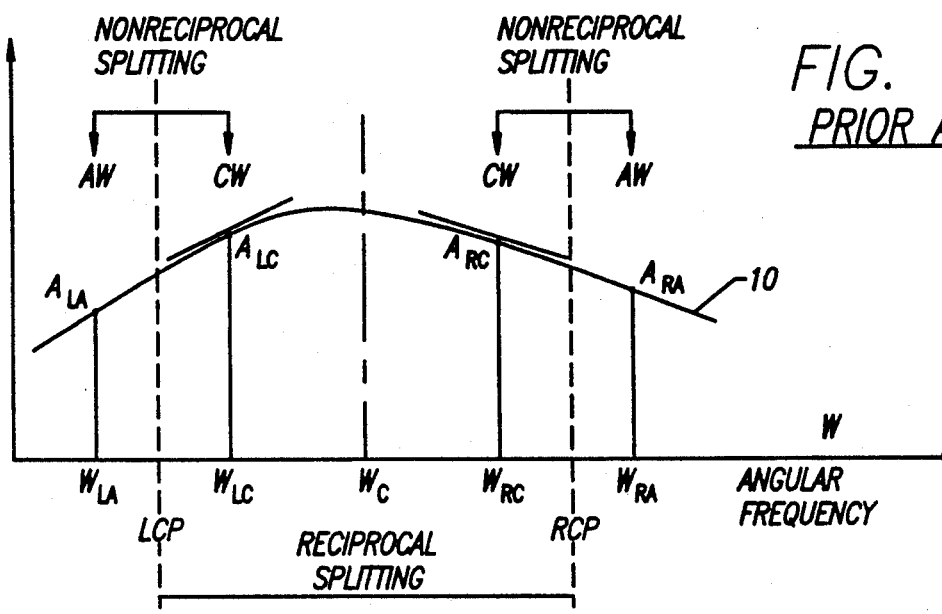
FIG. 1A is a PRIOR ART graphic representation of the operating gain curve of a four-mode multioscillator ring laser gyroscope.
Figure 1B:
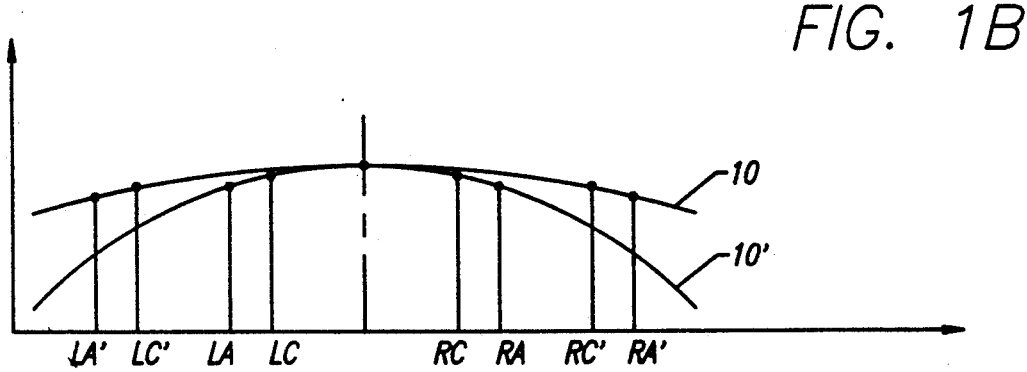
FIG. 1B is a graphic representation of the operating gain curve of a four-mode multioscillator ring laser gyroscope as taught by this invention and compares and contrasts the gain curves produced by high and low sensitivity piezo-electric transducers (PZT) used to control cavity length.
Figure 2A:
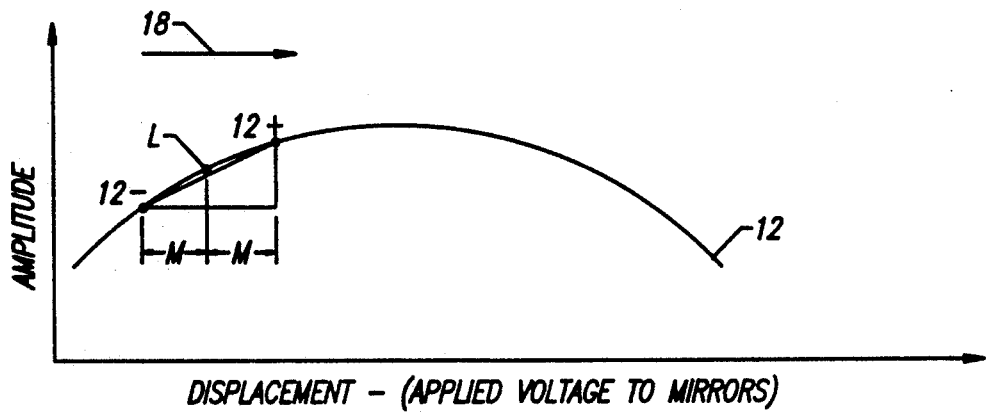
FIGS. 2A, 2B, and 2C show the detected data from the gain curves of FIGS. 1B and 1C and how that data may be used to determine slope of the gain curve and the maximum operating point of the gain curve.
Figure 2B:
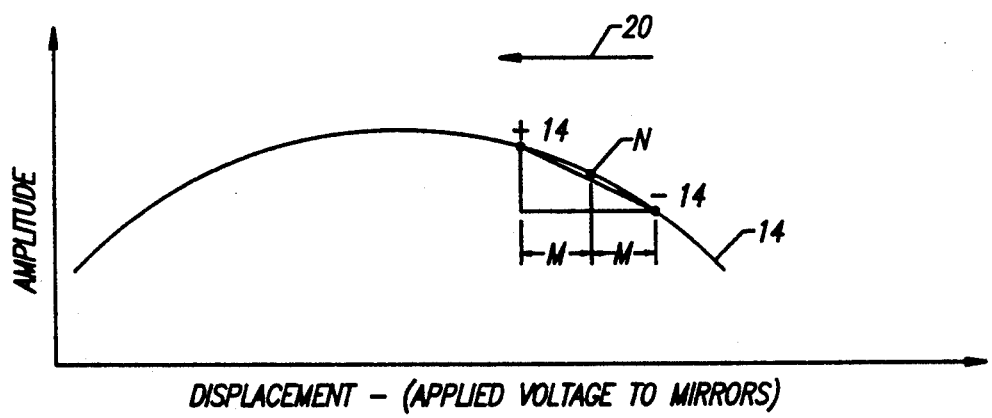
Figure 2C:
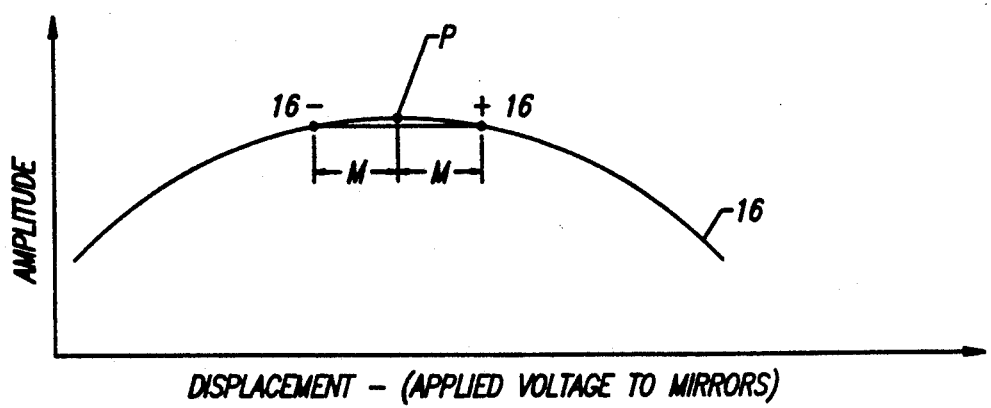

A more detailed description of the mechanical and optical electronic coupling into the ring laser gyroscope is schematically expressed in FIG. 4. The ring laser gyroscope physics package and instrument is mathematically and schematically modeled at 60. This model 60 includes a PZT transfer function 28', modeling the characteristics of the piezoelectric transducer affixed to mirror 28 of FIG. 3. The summing junction 62 (FIG. 4) sums a pre-determined reference value $X_o$ with the output "X" from the PZT transfer function 28' to provide an input "Y" to the gyroscope transfer function 64 (which mathematically models the gyroscope 30 of FIG. 3). The output of the gyroscope transfer function 64 is provided to the photodiode, represented in FIG. 4 by transfer function 32'. The voltages delivered to the transducer of the PZT cavity length controller (FIG. 3) adjust the inward-outward position of mirror 28. The amount of motion introduced depends upon the piezoelectric sensitivity of the PZT transducer affixed to corner mirror 28. The amount of motion is denoted, "Y", which is input to the gyroscope as previously described with reference to FIG. 4. This motion "Y" affects the gyroscope intensity in a parabolic and, to a lesser extent, quartic, fashion as shown by the equation in the gyroscope transfer function block 64 and as shown by FIGS. 2A, 2B, and 2C. Gain curves 12, 14, and 16 of FIGS. 2A, 2B, and 2C show gyroscope signal intensity as the ordinate (vertical axis) plotted against PZT applied voltage in the abscissa (horizontal axis). The voltage intensity "$I_o$" represents the voltage corresponding to the peak intensity of the gyroscope characteristic shown in FIGS. 2A, 2B, and 2C. "a" represents the sensitivity to path length errors as indicated in mode curvature. Graphically, "a" represents the curvature at the peak of the mode gain curves 12, 14, and 16 of FIGS. 2A, 2B, and 2C. The term "$D_o$" as used in the Equation Appendix tables and in FIG. 4 indicates the present control value to be added to the modulation controlling the mirror position and corresponds to the cavity length at the nearest mode peak. The modulation gain control loop 46 (FIGS. 3 and 4) is intended to observe and compensate for variations in PZT sensitivity and mode concavity. Through this loop 46, normalized modulation amplitude control is achieved to ensure that the modulation is a relatively constant fraction of a mode. This loop also permits prediction of the mode shape so that projection to the mode peak is possible. This loop ties into the curvature of the gain profile 10 and 10' of FIG. 1B. The mode shape observations make it possible to control CLC gain and model path length offset in "mode spacings", adjusting the mirror voltage to accommodate the curvature changes of the gain curve due to PZT sensitivity variations. Variation in gain profile shows the frequencies of the modes LA, LC, RA, and RC associated with the gain profile 10, while the modes LA', LC', RA', and RC' are associated with the gain profile 10'.

Figure 1C:
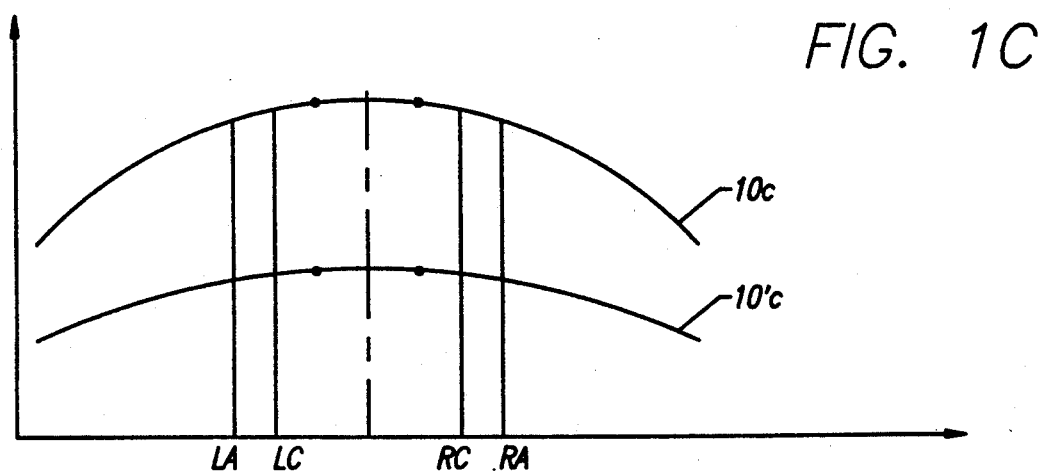
FIG. 1C is a graphic representation of the operating gain curve of a four-mode multioscillator ring laser gyroscope as taught by this invention and compares and contrasts the gain curves produced by high and low sensitivity photodetectors/electronics or high and low intensity.

The CLC servo-control loop 44 acts as a "hill climbing" servo which is controllable, in conjunction with the loop 42 to a commanded path length offset position ($P_{OFF}$ 87 of FIG. 4). While the reference offset 87 ultimately is applied as an offset to the slope of the intensity curve in summer 84, it is adjusted in such a way that 87 itself represents an offset in "mode space". Modeling of the path length offset will be in mode space as long as the mode concavity does not change for reasons other than PZT sensitivity changes. All three control loops 42, 44, and 46 are closed and stable. The operation of loop 42 is illustrated in FIG. 1C. Gain profiles 10 and 10' shoW a stronger amplitude gain profile $10_c$ contrasted with a low detector sensitivity profile $10'_c$. Note that the position of the mode frequencies LA, LC, RC, and RA associated with FIG. 1C are the same for both gain profiles $10_c$ and $10'_c$.

The signal delivered through the summing junction 50 by the pulsed, stepped, computer generated signal modulation source block 48 to the digital-to-analog converter 52 is shown graphically within that block 48. The pulsed voltage is divided into four time slots. (This is also true of the time slot demodulator 56, which is divided into summing and averaging demodulators 58A, 58B, 58C, and 58D. In the first and third time slots ($S_0$, $S_2$), only the operating voltage is delivered. In the second time slot ($S_1$) the operating voltage plus an increment, ($+M$) is delivered. In the fourth time slot ($S_3$), the operating voltage plus the decrement, ($-M$), is delivered. The entire cycle is continuously repeated.

With reference to FIG. 5, the cavity length control system implements a modulation and demodulation technique whereby four 1/512 sec wide (or 1/400 sec)

time slots (Slot 0, Slot 1, Slot 2, and Slot 3) are allocated which are used to control the DAC (digital-to-analog converter) setting by controlling the DAC setting ±the modulation. Demodulation is achieved at 56 and 58A-D by accumulating values in the four registers, each register corresponding to one of four current time slots. At a lower rate (e.g. 32 Hz), the CLC system associates the four accumulations in unique combinations to implement the CLC error demodulation, a PZT/loop gain error demodulation, and an RF AGC demodulation. The four 512 Hz time slots are allocated as shown in FIGS. 4 and 5. One demodulation integrator 58A through 58D is assigned to each time slot and the A/D value corresponding to the output of amplifier 34 (as sampled by sampler 55) is added to the appropriate integrator at 512 Hz. The D/A value is then updated with the appropriate value (the operating point=$D_0$; the operating point+modulation=$D_0+M$; and, the operating point modulation modulation−$D_0−M$). The subsequent A/D reading should then correspond to the new D/A value.

A reading of the laser intensity, measured by the photodiode 32 (FIG. 3), is sampled during each time slot (at the rate of 512 Hz in the preferred embodiment by the sample 55) and is delivered through the analog-to-digital converter 54 (FIG. 4) to the time slot demodulator 56. While the pulsed, stepped, computer generated signal modulation source block 56 and 58A-D perform demodulation functions, they are implemented very simply using additions in the microprocessor. Analog demodulators used in the prior art are not required.

The output of the time slot demodulator 56 is averaged over many cycles, by the summing and averaging demodulators 58A through 58D. This removes noise in the signal over time. The average value of the signal output of the summing and averaging demodulators 58A through 58D is sampled at sampler 57 of FIG. 4 to produce signals useful in controlling the gain of the primary CLC loop 44 (FIG. 4).

The time slot demodulator 56 provides data to the signal summer 82 (of FIG. 4), which produces a signal that is a measure of the difference between the signals sampled during the second ($S_1$) and fourth time ($S_3$) slots. That difference signal is a measure of the slope, shown in FIGS. 2A, 2B, and 2C, of the characteristic curve near the operating position. When the difference reaches zero, the operating position is at the mode peak P of FIG. 2C. The measurement range is between two points ±16. The difference measures slope, and it is analogous to first harmonic demodulation of an analog modulated apparatus. Like wise as to FIGS. 2A and 2B. FIG. 2A shows a slope between ±12 about point L, where the cavity is operating below the mode peak; while FIG. 2B shows a slope between ±14 about point N. (In FIG. 2A, the PZT will have to be moved in the direction 18 to achieve an optimum setting, while in FIG. 2B, the PZT will have to be moved the direction 20 for optimum operation. FIG. 2C shows the cavity operating at its most effective point (maximum intensity).

In FIG. 4, the output of the time slot demodulator 56 and demodulators 58A-D passes through signal summer 82. The output of 82 is provided to summer 84 where it is subtracted from the output of multiplier 86. This permits the cavity length control loop to operate at any desired point off the center of the mode (to be discussed further). The output of summer 84 is the CLC error signal which is multiplied in block 94 by the reciprocal of LPGD (output of signal combiner 90). The reciprocal is created by computational block 92. It serves to stabilize the loop gain of CLC loop 44 irrespective of operating conditions. The stabilized error signal is then multiplied in multiplier 96, by a constant $K_{CLC}$ which sets the loop gain, or equivalently the time constant of, the primary cavity length control loop. In block 98, the output of gain 96 is multiplied by the modulation amplitude M in effect at the time (output of block 105). This has the effect of scaling the CLC loop corrections to the proper mode concavity as determined by the modulation amplitude control loop 46. Block 98 provides corrections to the operating voltage through integrator 104.

The value of the operating voltage $D_0$ is accumulated in the summer or digital integrator 104, resulting in an output signal of $D_0$. The output of the multipliers 96 and 98 are limited in the integrator 104 to a reasonable voltage range to prevent spurious readings from severely perturbing the primary loop. The operating digital signal stored within the summer 104 is within an acceptable predetermined range of a particular mode peak.

The voltage from summer 104 corresponds to the voltage "$D_0$" during time slots ($S_0$) and ($S_2$) of the signal modulation source block 48. An increment or decrement ±M is added to that value during time slots ($S_1$) and ($S_3$).

The amplitude of the increment or decrement ±M is controlled through a secondary loop 46 which includes signal modulation source block 48. The values of the intensity signals from summing and averaging demodulators 58A-D during time Slot 0 and time Slot 2 are added, and the values during time Slot 1 and 3 are subtracted (See, FIG. 5). Thus, to demodulate the signal, only additions and subtractions, are used in the secondary loop of the digital CLC control system of this invention. The produced signal is a measure of the curvature of the intensity versus applied voltage curve. This demodulation formed by addition and subtraction is analogous to a second harmonic demodulation. The output sum of summer 90 is multiplied at the multiplier 93 by the reciprocal of the value RFGD (RF gain demodulation), from the computational block 69, resulting in the quotient LPGD/RFGD at observation point 101. The reciprocal of the value RFGD is useful to decouple the loop 46 from the RF gain control loop 42.

The value produced by multiplier 93 is subtracted at the summing junction 95 from a predetermined reference value (LREF) 103, and the difference signal is multiplied by $K_{LP}$ at 99, after the feedback through the multiplier 97, to produce a signal proportional to the error in the modulation amplitude M of the voltage increments and decrements.

The multiplication in block 97 by the old value of M is used to scale the error from a relative (i.e. percentage error) to an absolute error.

The multiplication in block 99 by $K_{LP}$ sets the loop gain (or equivalently time constant) of the modulation amplitude control loop. The signal output of block 99 is accumulated in integrator 105 to produce the desired modulation increment/decrement M which is used in the modulation source block 48 as well as in multipliers 97 and 98. Integrator 105 is limited in range in order to prevent spurious readings from causing unrealistic modulation amplitudes to occur.

Additionally, the output error sum from summer 90 denoted as LPGD is sent to the decoupling function 80, where it is combined with signal CLCD from summer 82 in order to isolate and decouple and protect the RF gain control loop 42 from the operation of servo-loop 44 and modulation control loop 46.

With reference to FIG. 4, the operation of the RF automatic gain control (AGC) loop 42 will be described. The primary operation of this loop 42 is to allow the cavity length control system to observe and correct for variations in the RF gain or in the gyroscope intensity for reasons other than cavity length variation. The summer 66 processes the 32 Hz signal from the sampler 57, to provide a signal which is summed at summing junction 68 with the output decoupling signal from the decoupling function block 80. Function 80 serves to project the intensity signal from its local value to its calculated value of the mode peak. The resulting output signal from summing junction 68 is then subtracted from the amplitude reference signal AREF from reference value block 78 at summing junction 70. The resulting error signal from junction 70 is multiplied by the automatic gain control constant $K_{AGC}$ (the feedback constant gain setting for the RF gain control loop) at 72, and then presented to the integrator 74. The output of the integrator 74 is supplied to a digital to analog converter 76 which generates a voltage ($V_G$) which modifies the gain of an RF amplifier gain stage 34 within the gyro electronics. The constant which relates the digital input to 76 ($D_G$) to its analog voltage output is denoted $K_{D2}$. (The term D/A converter or A/D converter refers to any electronic means which provides a translation or conversion of a digital signal to an analog signal or of an analog signal to a digital signal and is not limited to components conventionally called "A/D" or "D/A", but may also encompass other techniques such as pulse width modulation.) The converted analog output of D/A converter 76 is then used to adjust the gain of the RF amplifier 34 and close the loop 42. In this manner, variations in RF gain and/or gyroscope laser intensity may be compensated for.

Additionally, the RF gain control loop 42, together with the modulation control loop 46, grant the primary servo-loop 44 the ability to continue to control cavity length when proper multioscillator operation requires that the mode control point be a predetermined offset value, corresponding to POff 87 (the pathlength offset value). This is accomplished by combining the RFGD (RF gain demodulation) signal from loop 42 with the LPGD (loop gain demodulation) signal from modulation control loop 46 at the computational function block 88. The computed output value from block 88 is multiplied at multiplier 86 by the predetermined offset value Po (87), and the resulting product is combined with the CLCD (CLC demodulation), resulting in an output error signal from summing junction 84. The summed output signal from summing junction 84 is then multiplied at multiplier 94 by the reciprocal of the loop gain demodulation (LPGD) signal (formed at the modulation loop transfer block 92) in order to stablize the gain of the CLC loop 44. (LPGD is derived from the modulation control loop 46.) The error signal so generated is then processed through the servo loop discussed previously to ensure a stable operation at the point commanded by the offset. The resulting path length offset moves the gyroscope operating point off the mode peak ($W_c$ of the gain curve 10 of FIG. 1A.) Since the mode shape shown in FIG. 1A through FIG. 1C very closely resembles a parabola, a projection of the peak mode intensity can be made as a function of the offset and parameters derived from the demodulators. The RF AGC Loop 42 servos to a projected peak intensity, rather than a local intensity. This feature of the offset mechanism carried out at the computational function 80 and its associated processing blocks which combine CLCD and LPGD to render the RF signal gain insensitive to path length offset. In this manner, mode sweeps can be performed by sweeping the offset value commanded; the cavity length control system is then able to operate as if there were no peak offset.

The loop closure equations are given in the Equation Appendix, Tables I-IV. An effort has been made to normalize the error signals to yield stable time constants. The RF gain control loop 42 may need adjustment because of the wide range of sensitivity of RF gain to gain control input voltage. Also, it helps to start the RF gain too high rather than too low since convergence or steady state operation may be thereby achieved in a shorter time. Suggested values for the preferred embodiment of the invention are given in the Appendix Tables. These values are within a preferred range, but future operation outside the confines of these ranges is anticipated. The following Tables I IV have been referred to in the text of this detailed description of the preferred embodiment and are set out to mathematically describe and clarify the invention. The drawings, and in particular the flow diagram of FIG. 4, follow functionally the equations set forth in these Tables I through IV.

TABLE I

EQUATION APPENDIX - GYROSCOPE MODEL

| | |
|---|---|
| A = | $K_{AD} G K_{RF} I_0 (1 - a_2 (P K_{D1} (D - D_T))^2)$, where A is the A/D output [AREF is 131072 (0.5 Volt level)] |
| $K_{AD}$ | is the A/D scale factor in counts/volt |
| $K_{LP}$ | is feedback constant gain, setting the time constant for the modulation control loop. [$K_{LP}$ is chosen for time constant $T_L$ = 375 msec Acquire, 1.55 sec Track, where, M is as follows: 1 V ≦ M ≦ 5 V.] |
| $K_{AGC}$ | is the feedback constant gain setting for the RF gain control loop. [$K_{AGC}$ is chosen for time constant $T_A$ = 3.1 sec Acquire, 12.5 sec Track, where, $\|\Delta V_G\| \leq 0.1$ V. and where, $V_G$ is as follows: 0 V ≦ $V_G$ ≦ 1.78 V.] |
| $K_{CLC}$ | is the feedback constant gain setting for the CLC control loop. [$K_{CLC}$ is chosen for time constant $T_C$ = 234 msec Acquire, 984 msec Track] |
| $K_{D1}$ | relates the D setting to voltage (V = $K_{D1}$ * D) |
| $K_{D2}$ | relates D ($D_G$) setting to voltage ($V_G$); ($V_G = K_{D2} * D_G$) |
| G | is the variable gain controlled by $V_G$ |
| $I_0$ | is the Gyroscope Intensity |
| $a_2$ | represents the Mode Curvature. $a_2$ is the 2nd derivative of the intensity versus voltage curve at mode peak |
| P | is the PZT Sensitivity |
| D | is the D/A setting that generates the voltage V |
| $D_0$ | is the present control value to be added to modulation; D = $D_0$, ($S_0,S_2$); D = $D_0$ + M, ($S_1$); D = $D_0$ - M, ($S_3$) |
| $D_r$ | is the D/A setting that would truly be the m/peak and generates the voltage $V_T$ corresponding to the mode peak |
| M | is the Amplitude of the Modulation of the Digital signal |
| N | is the number of Modulation Cycles per update Cycle |
| $P_{OFF}$ | is Pathlength Offset; |

TABLE II

DEMODULATION EQUATIONS

| | |
|---|---|
| CLCD | is CLC Demodulation; = $S_3 - S_1$; |
| LPGD | is Loop Gain Demodulation; = $S_0 - S_1 + S_2 - S_3$ [LPGD lower limit, both Acquire and Track is 0.] |
| RFGD | is RF Gain Demodulation; = $S_0 + S_2 + \frac{1}{4} (CLCD)^2/LPGD$ |
| LREF | is loop reference; AREF is amplitude reference. [LREF, both Acquire and Track is 0.0025.] |

TABLE III
CONTROL GOALS

| | |
|---|---|
| ADJUST D SUCH THAT CLCD | $= P_{OFF} [(LPGD)(RFGD)]^{\frac{1}{2}}$ |
| ADJUST M SUCH THAT LPGD | $= LREF * RFGD$ |
| ADJUST G SUCH THAT RFGD | $= AREF$ |
| $CLCD = S_3 - S_1$ | $= 4N\, K_{AD}\, G\, K_{RF}\, I_0\, a_2\, K_{D1}^2\, P^2\, M\, (D - D_T)$ |
| $LPGD = S_0 - S_1 + S_2 - S_3$ | $= 2N\, K_{AD}\, G\, K_{RF}\, I_0\, a_2\, K_{D1}^2\, P^2\, M^2$ |
| $RFGD = S_0 + S_2 + \frac{1}{4}(CLCD)^2 / LPGD$ | $= 2N\, K_{AD}\, G\, K_{RF}\, I_0$ |
| CLC CONTROL LAW; $D_0$ | $= D_0 + K_{CLC} * M/LPGD * \{P_{OFF}*[(LPGD)(RFGD)]^{\frac{1}{2}} - CLCD\}$ |
| MODULATION AMPLITUDE CONTROL LAW; M | $= M + K_{LP} * M * [LREF - LPGD/RFGD]$ |
| RF GAIN CONTROL LAW; $D_G$ | $= D_G + K_{AGC} * [A_{REF} - RFGD]$ |

TABLE IV
EQUATION DERIVATION - FROM GYROSCOPE MODEL $A = K_{AD}\, G\, K_{RF}\, I_0\, (1 - a_2\, (P\, K_{D1}\, (D - D_T))^2)$
FOR SLOTS 0, 2: $D = D_0$; thus,
$A = K_{AD}\, G\, K_{RF}\, I_0\, (1 - a_2\, (P\, K_{D1}\, (D_0 - D_T))^2)$
FOR SLOT 1: $D = D_0 + M$; thus,
$A = K_{AD}\, G\, K_{RF}\, I_0\, (1 - a_2\, (P\, K_{D1}\, (D_0 - D_T + M))^2)$
$\quad = K_{AD}\, G\, K_{RF}\, I_0\, (1 - a_2\, (P\, K_{D1})^2\, ((D_0 - D_T)^2 + 2(D_0 - D_T)M + M^2))$
FOR SLOT 3: $D = D_0 - M$; thus,
$A = K_{AD}\, G\, K_{RF}\, I_0\, (1 - a_2\, (P\, K_{D1}\, (D_0 - D_T - M))^2)$
$\quad = K_{AD}\, G\, K_{RF}\, I_0\, (1 - a_2\, (P\, K_{D1})^2\, ((D_0 - D_T)^2 - 2(D_0 - D_T)M + M^2))$
BECAUSE THE $S_0, S_1, S_2, S_3$ ACCUMULATE OVER N CYCLES, IT
FOLLOWS THAT THE ABOVE VALUES ARE N TIMES LARGER WHEN
EXPRESSED AS THE S's. THUS:
$S_0 = S_2 = N\, K_{AD}\, G\, K_{RF}\, I_0\, (1 - a_2\, (P\, K_{D1}\, (D_0 - D_T)^2))$
$S_1 = N\, K_{AD}\, G\, K_{RF}\, I_0\, (1 - a_2\, (P\, K_{D1})^2\, ((D_0 - D_T)^2 + 2(D_0 - D_T)M + M^2))$
$S_3 = N\, K_{AD}\, G\, K_{RF}\, I_0\, (1 - a_2\, (P\, K_{D1})^2\, ((D_0 - D_T)^2 - 2(D_0 - D_T)M + M^2))$
THUS, $CLCD = S_3 - S_1 = 4N\, K_{AD}\, G\, K_{RF}\, I_0\, a_2\, (P\, K_{D1})^2\, M\, (D_0 - D_T)$;
$LPGD = S_0 - S_1 + S_2 - S_3 = N\, K_{AD}\, G\, K_{RF}\, I_0\, \{(1 - a_2\, (P\, K_{D1})^2 *$
$(D_0 - D_T)^2 - 1 + a_2\, (P\, K_{D1})^2\, ((D_0 - D_T)^2 + 2(D_0 - D_T)M + M^2)) +$
$1 - a_2\, (P\, K_{D1})^2 * (D_0 - D_T)^2 - 1 + a_2\, (P\, K_{D1})^2\, ((D_0 - D_T)^2$
$- 2(D_0 - D_T)M + M^2)) = 2N\, K_{AD}\, G\, K_{RF}\, I_0\, a_2\, (P\, K_{D1})^2\, M^2$.
$RFGD = S_0 + S_2 + \frac{1}{4}(CLCD)^2/LPGD$
$= 2N\, K_{AD}\, G\, K_{RF}\, I_0 * (1 - a_2\, (P\, K_{D1})\, (D_0 - D_T)^2)) +$
$\frac{1}{4}\{[16\, N^2\, K_{AD}^2\, G^2\, K_{RF}^2\, I_0^2\, a_2^2\, P^4\, K_{D1}^4\, M^2\, (D_0 - D_T)^2]/$
$[2N\, K_{AD}\, G\, K_{RF}\, I_0\, a_2\, P^2\, K_{D1}^2\, M^2]\};$
$= 2N\, K_{AD}\, G\, K_{RF}\, I_0 * (1 - a_2\, P^2\, K_{D1}^2\, (D_0 - D_T)^2) +$
$2N\, K_{AD}\, G\, K_{RF}\, I_0\, a_2\, P^2\, K_{D1}^2\, (D_0 - D_T)^2 = 2N\, K_{AD}\, G\, K_{RF}\, I_0.$ Thus, the cavity length control apparatus described herein is relatively less expensive and less complicated than the existing control devices which utilize optical components and polarizers. Furthermore, the present cavity length control apparatus includes a feedback system which automatically adjusts the length of the cavity path for precise control of the multioscillator inertial sensor regardless of the out-of-plane or non-planar configuration of the multioscillator.

While preferred embodiments are shown, it is clear that alternative equivalent embodiments of the invention may be envisioned which provide adequate alternatives, performing similar functions to the preferred embodiment, yet using the basic teachings and principles of the herein described invention. For example, the modulation control 46 might modulate the primary CLC loop 44 signal by another method of modulation other than amplitude modulation. Also, although the operation of this invention has been discussed primarily in the context of a multioscillator ring laser gyroscope, two mode planar dithered ring laser gyroscopes, as well as all other forms of ring laser angular rate sensors, are intended to be comprehended within the scope of these claims. Thus, alternate embodiments having substantially equivalent functions or structures are intended to be comprehended within the scope of the appended claims.

What is claimed is:

1. A ring laser gyroscope cavity length control system, comprising, in combination:

a ring laser gyroscope defining an optical pathway having electromagnetic propagating waves circulating among at least three corner mirrors comprising said optical pathway, at least one of which is partly transmissive, and at least one of which is movable inwardly and outwardly;

driver means for moving said at least one corner mirror inwardly and outwardly for purposes of cavity length control;

means for providing a controlled activation of said driver means, including:

transducer means for measuring the intensity of electromagnetic propagating waves circulating within said gyroscope;

servo-loop control means for controlling the movement of said at least one mirror which produces a servo-loop control signal that is a function of mirror driver voltage and the change in said electromagnetic propagating wave intensity as such intensity relates to said driver voltage;

modulation control means for controlling the amplitude of the modulation of the servo-loop control signal of said servo-loop control means, said modulation control means additionally producing a gain control signal that is a function of said mirror driver voltage and having sensitivity to the change in said wave intensity as such intensity relates to said driver voltage; and, radio-frequency (RF) gain control means for adjusting the amplitude of a detected signal representing gyroscope intensity;

whereby, a stable servo-loop gain is achieved for controlling said at least one mirror.

2. The ring laser gyroscope cavity length control system of claim 1, wherein said modulation control means for controlling the amplitude of the modulation of the servo-loop control signal of said servo-loop control means, further includes:

digitally directed modulation means providing a digital modulation control signal to said servo-loop control means;

said digitally directed modulation means operatively associated with a signal modulation means;

said signal modulation means providing a pre-determined digital alternating signal to said driver means;

whereby, said modulation control means produces a gain control signal that is a function of said mirror driver voltage and has sensitivity to the change in said wave intensity as such intensity relates to said driver voltage.

3. The ring laser gyroscope cavity length control system of claim 1, wherein said radio-frequency (RF) gain control means for adjusting the amplitude of a detected gyroscope intensity signal further comprises:

digitally directed means providing a digital demodulation control signal to said RF gain control means;

means for receiving input signals from said modulation control means and said servo-loop control means;

means for combining said demodulation and servo-loop control input signals with a pre-determined reference signal;

intermediate gain controlling means providing an RF control output signal that is a function of said input signals and said pre-determined reference signal;

whereby RF gain control is achieved.

4. The ring laser gyroscope cavity length control system of claim 1, wherein:

said modulation control means for controlling the amplitude of the modulation of the servo-loop control signal and said RF gain control means for adjusting the amplitude of a detected gyroscope intensity signal are operatively associated such that decoupling and operating point offset signals generated in said modulation control means are fed to said RF gain control means and decoupling signals from said RF gain control means are fed to said modulation control means;

whereby, said modulation control means and said RF gain control means are decoupled from one another and the cavity length control system continues to function when the operating point of the ring laser gyroscope is offset.

5. The ring laser gyroscope cavity length control system of claim 4, wherein:

signals processed by said servo-loop control means are combined with the decoupling signals from said modulation control means and fed to said RF gain control means;

whereby, the voltage applied to the cavity length control PZT and mirror may be adjusted relative to detected gyroscope signal intensity and the RF gain control may be decoupled from said servo-loop control means.

6. An apparatus for controlling the cavity length of a multioscillator ring laser gyroscope, comprising, in combination:

a multioscillator ring laser gyroscope cavity defining an optical pathway sustaining at least left circularly polarized and right circularly polarized pairs of counterpropagating electromagnetic waves circulating among at least four corner mirrors comprising said optical pathway, at least one of which is partly transmissive, and at least one of which is movable inwardly and outwardly;

means for mixing the circulating electromagnetic waves propagating in a first rotational direction, one of said waves being substantially left circularly polarized and the other being substantially right circularly polarized;

means for sinusoidally modulating the amplitudes of said beams at a modulating frequency;

means for detecting the amplitude modulation of said mixed beam pair;

means for detecting the amplitude component of said amplitude modulation at said modulation frequency;

servo-loop control means for controlling the length of said cavity in response to said amplitude modulation component at said modulation frequency;

said servo-loop control means controlling means for adjusting the length of said cavity;

modulation control means for controlling the amplitude of the modulation of servo-control signals produced by the servo-loop control means, said modulation control means additionally producing a gain control signal that is a second harmonic function of said mirror driver voltage and is sensitive to the change in said wave intensity as such intensity relates to said driver voltage; and, radio-frequency (RF) gain control means for adjusting the amplitude of a detected signal representing gyroscope intensity;

whereby, a stable servo-loop gain is achieved for controlling said at least one mirror of a multioscillator ring laser gyroscope.

7. The apparatus of claim 6 for controlling the cavity length of a multioscillator ring laser gyroscope, wherein:

said modulation control means for controlling the amplitude of the modulation of servo-control signals produced by the servo-loop control means further includes:

a time slot demodulator, providing digitally coded signals representative of any changes in cavity length in relation to said modulation control means;

a first multiplier for multiplying a set of summed signals from said time slot demodulator and said RF gain control means, resulting in a first multiplied signal;

said first multiplied signal being subtracted from a predetermined loop reference signal producing a loop error sum signal;

said loop error signal being multiplied by a feedback signal from said servo-loop control means, producing a multiplied loop error sum signal;

integrator means for summing said multiplied loop error sum signal producing a modulation control signal which may be used to adjust the voltage applied to a movable mirror of one of said mirrors of said gyroscope in relation to said second harmonic function of said mirror drive voltage.

8. The apparatus of claim 6 for controlling the cavity length of a multioscillator ring laser gyroscope, wherein:

said radio-frequency (RF) gain control means for adjusting the amplitude of a detected signal representing gyroscope intensity further includes:

means for adjusting an RF gain demodulation signal from said servo-loop control means to a predetermined amplitude reference;

integrator means for processing an adjusted RF gain demodulation signal;

multiplier means for multiplying an integrated adjusted RF gain demodulation signal by a pre-determined constant value;

digital-to-analog converter means for converting a digital signal from said multiplier means to an analog RF adjustment signal suitable to adjust the gain of an RF amplifier coupled to said amplitude modulation detecting means;

whereby, the gain of said RF amplifier of the amplitude modulation detecting means may be adjusted to compensate for a wide range of multioscillator ring laser gyroscope operating optical signal intensities.

9. The apparatus of claim 6 for controlling the cavity length of a multioscillator ring laser gyroscope, including:

means for offsetting the operating control point of the cavity length control system of said ring laser gyroscope off mode peak;

said offsetting means comprising:

means for combining, according to a predetermined formula, a loop gain demodulation signal from said servo-loop control means with an RF gain demodulation signal from said radio-frequency (RF) gain control means;

means for adjusting an output signal from said signal combining means to a predetermined pathlength offset reference value, producing a pathlength offset adjusted signal;

means for combining said pathlength offset adjusted signal with a CLC demodulation signal from said servo-loop control means, producing a combined adjusted pathlength offset signal;

and, means for multiplying said combined adjusted pathlength offset signal by the reciprocal of said loop gain demodulation signal of said servo-loop control means;

whereby, the cavity length control apparatus may operate properly when the ring laser gyroscope is required to operate off its mode peak.

* * * * *